US012766500B2

(12) United States Patent
Park et al.

(10) Patent No.: US 12,766,500 B2
(45) Date of Patent: Oct. 20, 2026

(54) SOCKET FOR COUPLING CAPILLARY TIP

(71) Applicant: BODITECH MED INC., Gangwon-Do (KR)

(72) Inventors: Sang Hyun Park, Seoul (KR); Byeong Chul Kim, Gangwon-Do (KR)

(73) Assignee: BODITECH MED INC., Gangwon-Do (KR)

( * ) Notice: Subject to any disclaimer, the term of this patent is extended or adjusted under 35 U.S.C. 154(b) by 594 days.

(21) Appl. No.: 18/031,114

(22) PCT Filed: Nov. 1, 2021

(86) PCT No.: PCT/KR2021/015596
§ 371 (c)(1),
(2) Date: Apr. 10, 2023

(87) PCT Pub. No.: WO2022/108177
PCT Pub. Date: May 27, 2022

(65) Prior Publication Data

US 2023/0405576 A1 Dec. 21, 2023

(30) Foreign Application Priority Data

Nov. 20, 2020 (KR) ........................ 10-2020-0156276

(51) Int. Cl.
*B01L 3/02* (2006.01)

(52) U.S. Cl.
CPC ............. *B01L 3/0275* (2013.01); *B01L 3/021* (2013.01); *B01L 3/022* (2013.01); (Continued)

(58) Field of Classification Search
None
See application file for complete search history.

(56) References Cited

U.S. PATENT DOCUMENTS 3,406,573 A 10/1968 Burke
5,059,398 A 10/1991 Kenney
(Continued)

FOREIGN PATENT DOCUMENTS

CN 107693027 A * 2/2018 ............. B29C 49/04
CN 108896542 A 11/2018
(Continued)

OTHER PUBLICATIONS

International Search Report issued by ISA/KR in connection with PCT/KR2021/015596 dated May 27, 2022.
(Continued)

*Primary Examiner* — Maris R Kessel
*Assistant Examiner* — Madison T. Herbert
(74) *Attorney, Agent, or Firm* — Klintworth & Rozenblat LLP

(57) ABSTRACT

The present invention relates to a socket for coupling a capillary tip, comprising: a body in which an intra-tubular passage penetrating through both sides thereof is formed, a suction unit of sample collection equipment is provided to be coupled to one side, and a capillary tip is provided to be coupled to the other side; a pressure-varying hole unit which is formed in the body and includes a through hole formed through the intra-tubular passage and the outside of the body; and an opening-and-closing unit which is elastically supported by the pressure-varying hole unit and is installed to close or communicate the through hole and the intra-tubular passage while moving with an elastic force. The present invention can expand the use area for the utilization of capillary tips and can simplify a sample-collecting configuration through the application of manual sampling equipment.

5 Claims, 7 Drawing Sheets

(52) U.S. Cl.
CPC ... *B01L 2200/023* (2013.01); *B01L 2200/025* (2013.01); *B01L 2200/026* (2013.01); *B01L 2200/04* (2013.01); *B01L 2200/0684* (2013.01); *B01L 2300/0838* (2013.01); *B01L 2300/14* (2013.01)

(56) References Cited

U.S. PATENT DOCUMENTS

| | | | | |
|---|---|---|---|---|
| 10,814,320 | B2 | 10/2020 | Le et al. | |
| 2003/0177849 | A1* | 9/2003 | Matsuda | B01L 3/0279 73/864.16 |
| 2012/0312836 | A1 | 12/2012 | Eickhoff et al. | |
| 2017/0297013 | A1* | 10/2017 | Cohen | G01N 1/14 |
| 2019/0079045 | A1 | 3/2019 | Goebbert et al. | |

FOREIGN PATENT DOCUMENTS

| | | | | | |
|---|---|---|---|---|---|
| CN | 208146014 | U | * | 11/2018 | |
| EP | 1012560 | B1 | | 5/2003 | |
| KR | 100697634 | B | | 3/2007 | |
| KR | 101713172 | B | | 3/2017 | |
| WO | WO2017/216339 | A1 | | 12/2017 | |
| WO | WO2019/025626 | A1 | | 2/2019 | |
| WO | WO-2019096993 | A1 | * | 5/2019 | B01L 3/021 |

OTHER PUBLICATIONS

Written Opinon issued by ISA/KR in connection with PCT/KR2021/015596 dated May 27, 2022.

* cited by examiner

SOCKET FOR COUPLING CAPILLARY TIP

TECHNICAL FIELD

The present invention relates to a socket for coupling a capillary tip, and more particularly, to a socket for coupling a capillary tip to allow a small amount of sample to be collected by utilizing the capillary tip, but to use the capillary tip by coupling it with a manual sampling equipment, thereby expanding the use area of the capillary tip.

BACKGROUND ART

Various chemical or biochemical tests for measuring biological indicators related to specific diseases, general health conditions, or infections are generally performed through multi-step chemical reactions and physical manipulations using various reagents and instruments. For example, in the case of detecting a specific chemical substance contained in a sample such as blood, or a biochemical substance such as protein, it requires several steps of physical manipulation of: collecting a sample, placing the collected sample in a certain container, reacting it with one or more reagents, and then distributing the reacted sample from the container.

If the sample to be analyzed (e.g., blood), the detection antibody labeled with a fluorescent substance, and whole blood are used, the solution (reagent) to which the red blood cell lysis reagent is added is mixed in a quantitative ratio to be reacted so that the sample may be loaded onto the sample pad of the analysis device or cartridge to perform the analysis. In this case, accurate and reproducible analysis is possible only when the exact amount of sample is loaded.

The measurement of an accurate sample amount is an important physical quantity to be measured that is directly related to the accuracy of the measurement result. As the current volume measuring devices can be considered to have reached an error level of a few microliters, the error in the measurement results due to the error in the sample volume is negligible in the general measurement method where the sample volume is around milliliters (ml), and therefore need not be a major concern. However, when the entire volume of the sample is at the level of micro-liters (μl), a completely new problem arises in improving measurement precision. In the case of precise diagnosis where the entire volume of the sample is a few microliters, the error in sample volume measurement should be reduced to a corresponding level too. To achieve this, the applicant has developed pipette tips and pipette systems (Korean patent registration number 10-1713172) to minimize errors in sample collection. In other words, the pipette tips developed by the applicant enable the collection of samples by utilizing capillary action, allowing for accurate quantitative collection of small amounts of samples without errors.

However, the conventional pipette tips mentioned above require the use of a pipette system to collect samples, which presents a problem in that specialized knowledge of operating the pipette system is required for sample collection. In other words, conventional pipette tips can only be used by skilled operators, which limits their applicability and scalability.

DISCLOSURE

Technical Problem

Therefore, the present invention aims to provide a socket for coupling a capillary tip so as to expand the range of applications for capillary tips.

Furthermore, the present invention also aims to simplify the configuration for use of a capillary tip.

Furthermore, the present invention also aims to provide a socket for coupling a capillary tip so as to increase the convenience of sample collection.

Technical Solution

The present invention for achieving the above-mentioned objectives provides a socket for coupling a capillary tip, comprising: a body in which an intra-tubular passage penetrating through both sides thereof is formed, a suction unit of sample collection equipment is provided to be coupled to one side thereof, and a capillary tip is provided to be coupled to the other side thereof; a pressure-varying hole unit which is formed in the body, and includes a through hole formed to communicate the intra-tubular passage to outside of the body; and an opening-and-closing unit which is elastically supported by the pressure-varying hole unit, and is installed to close or communicate the through hole and the intra-tubular passage while moving with an elastic force.

Preferably, the intra-tubular passage comprises: an insertion hole formed on one side of the body, and having such inner diameter that a suction unit of the sample collection equipment can be inserted thereinto; a central hole formed on one side of the insertion hole so to communicate to the through hole, and having a inner diameter smaller than an inner diameter of the insertion hole; and a connection hole formed on the other side of the body, and for communicating to an inside of the capillary tip as a passage; wherein the inner diameter of the insertion hole is formed larger than the inner diameter of the central hole, wherein the inner diameter of the central hole is formed larger than an inner diameter of the connection hole.

Preferably, the pressure-varying hole unit comprises stepped holes that have inner diameters larger than an inner diameter of the through hole towards an outside of the through hole, and the opening-and-closing unit comprises: an elastic body installed on a step formed between the stepped hole and the through hole; and a pressing member supported by the elastic body, and for opening and closing the through hole while reciprocating between the stepped hole and the through hole with the elastic force of the elastic body.

Advantageous Effects

The socket for coupling a capillary tip according to the present invention has the effect of expanding the range of applications for capillary tips by allowing them to be used not only with motorized equipment but also with manual sample collection equipment such as pipettes. Furthermore, the present invention can simplify the configuration for use of a capillary tip by enabling them to be coupled and used with pipettes. Therefore, the present invention has the effect of increasing competitiveness in fields such as individual testing of sample quantities or emergency medicine. In addition, the present invention also has the effect of increasing the convenience of sample collection because sample collection using capillary action can be performed through the pressing operation of the opening-and-closing unit.

BEST MODE

The following is a detailed description of the preferred embodiment of the socket for coupling a capillary tip according to the present invention, with reference to the attached drawings.

Figure 1:
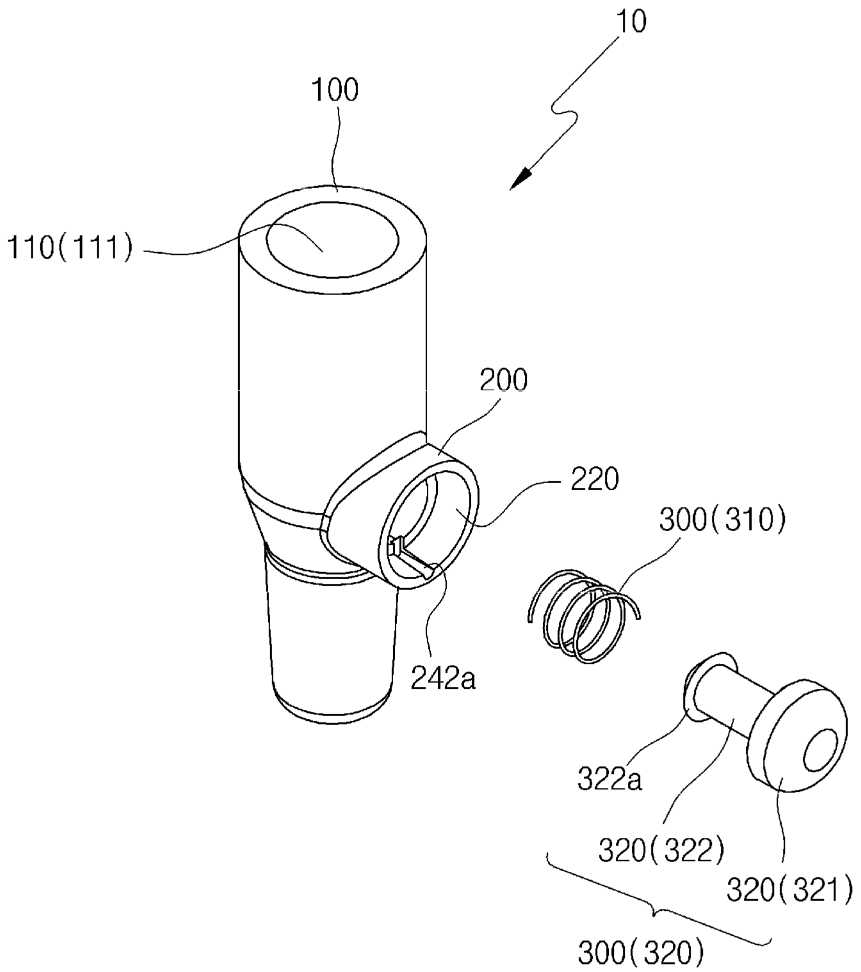
FIG. 1 is an exploded view of the socket for coupling a capillary tip according to a preferred embodiment of the present invention.
Figure 2:
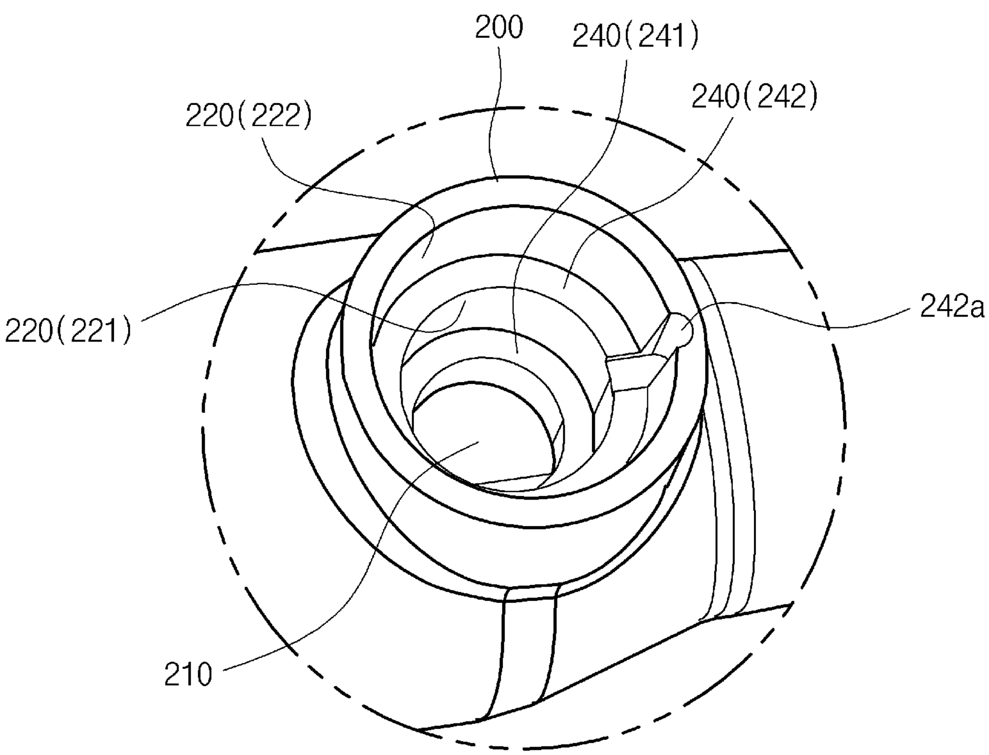
FIG. 2 shows a main part of a pressure-varying hole unit of the socket for coupling a capillary tip according to the embodiment of the present invention shown in FIG. 1.
Figure 3:
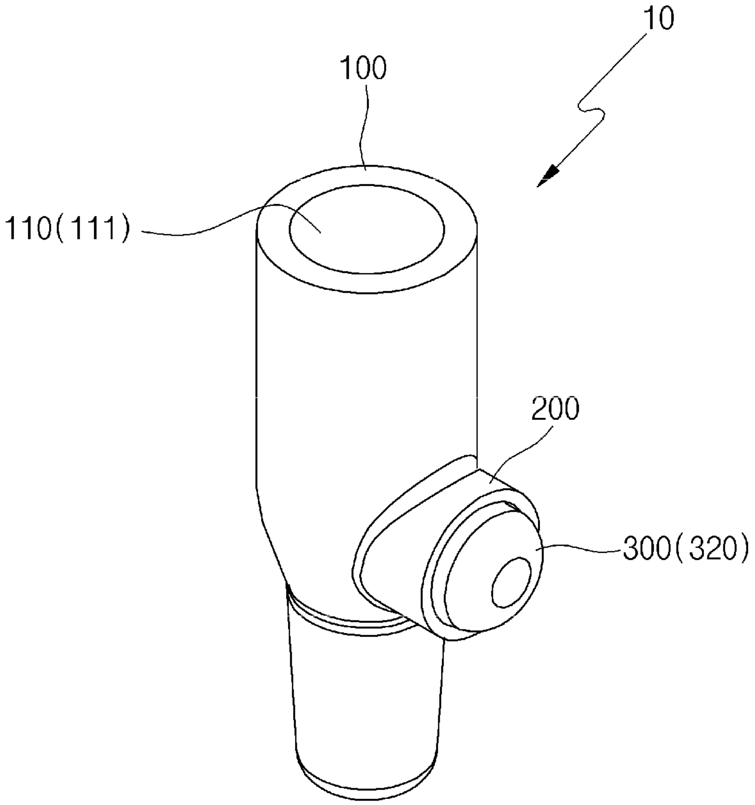
FIG. 3 illustrates the socket for coupling a capillary tip according to a preferred embodiment of the present invention.

FIG. 1 is an exploded view of the socket 10 for coupling a capillary tip according to a preferred embodiment of the present invention. FIG. 3 illustrates the coupling state of the socket for coupling a capillary tip. As shown in FIGS. 1 and 3, the socket 10 for coupling the capillary tip includes a body 100, a pressure-varying hole unit 200, and an opening-and-closing unit 300. FIG. 2 shows a main part of the pressure-varying hole unit.

The body 100 forms the outer appearance of the socket 10 for coupling sampling tip and has an intra-tubular passage 110 that penetrates through both sides of the body 100. The intra-tubular passage 110 is a pressure channel through which suction and discharge pressures can be created, and is formed to penetrate both sides of the body 100 in the longitudinal direction of the body 100. At this time, one side of the body 100 is provided to be coupled to the sample collection equipment, and the other side of the body 100 is provided to be coupled to the capillary tip 500. For convenience of explanation in this specification, a mini pipette is used as an example of the sample collection equipment, but it is not limited to a mini pipette as the sample collection equipment.

Figure 4:
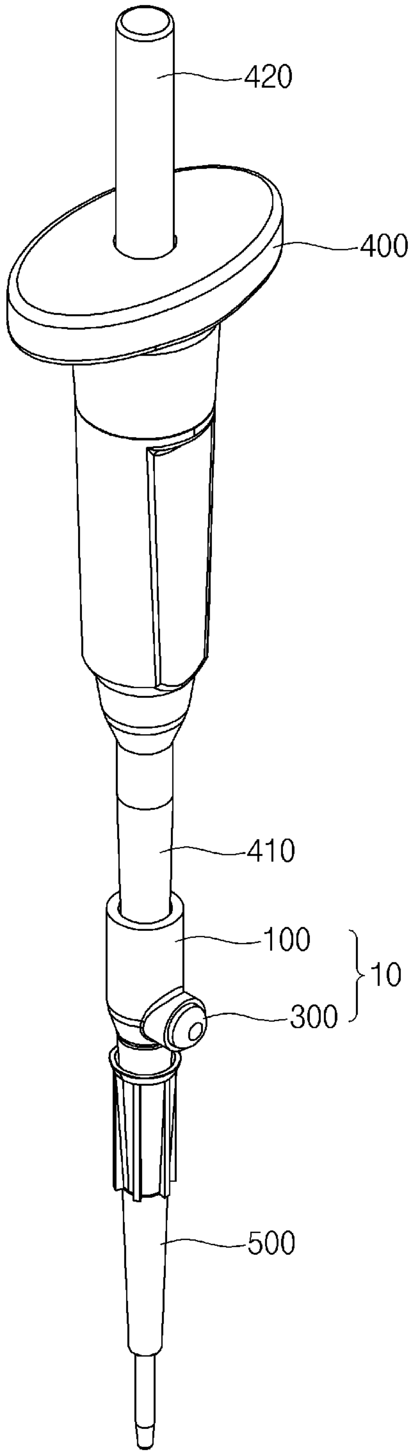
FIG. 4 illustrates the socket for coupling a capillary tip according to the embodiment of the present invention illustrated in FIG. 1, with a mini pipette coupled with the capillary tip.
Figure 5A:
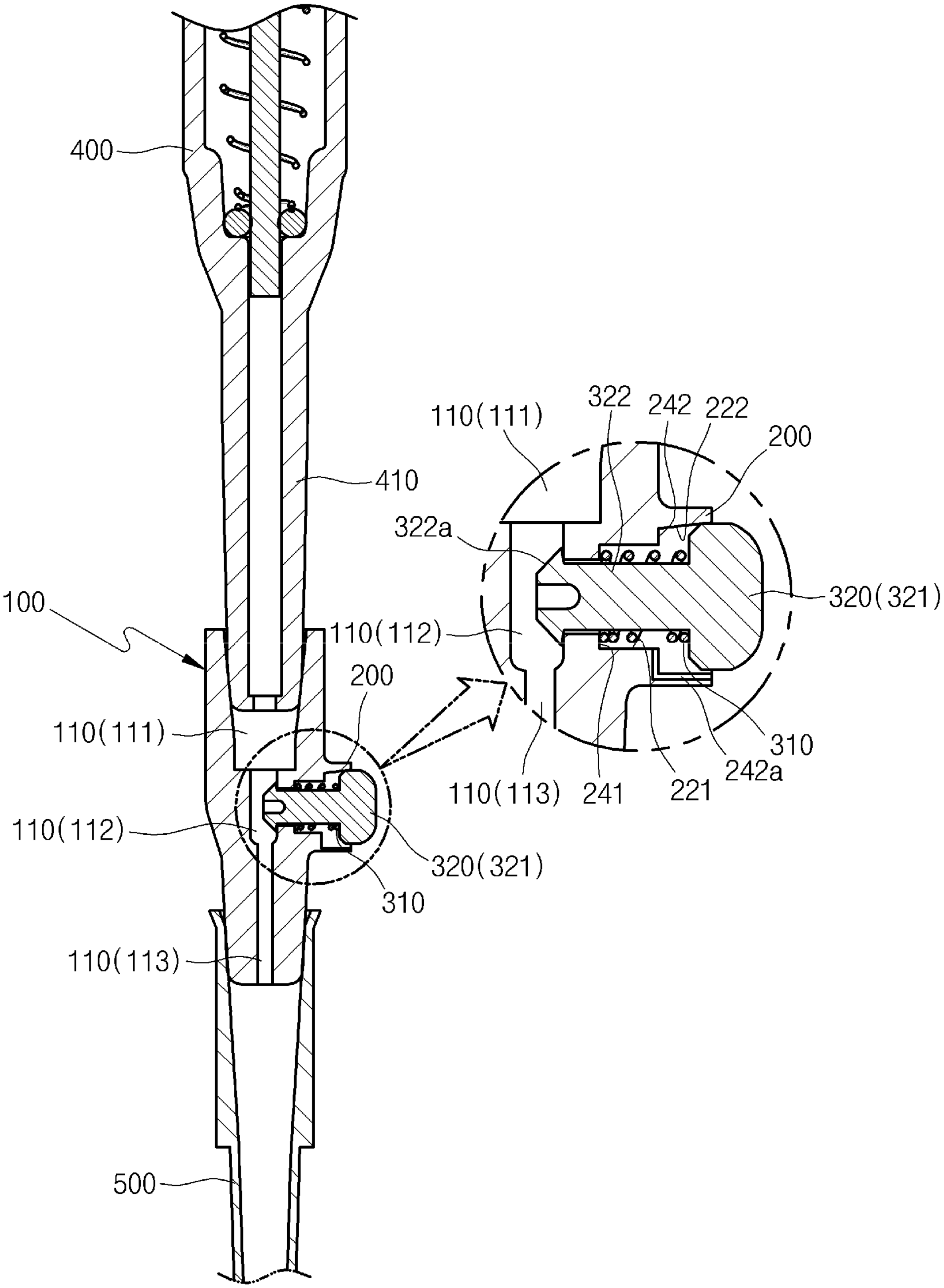
FIGS. 5A to 5C illustrate the operation of the socket for coupling a capillary tip according to the embodiment of the present invention shown in FIG. 1.
Figure 5B:
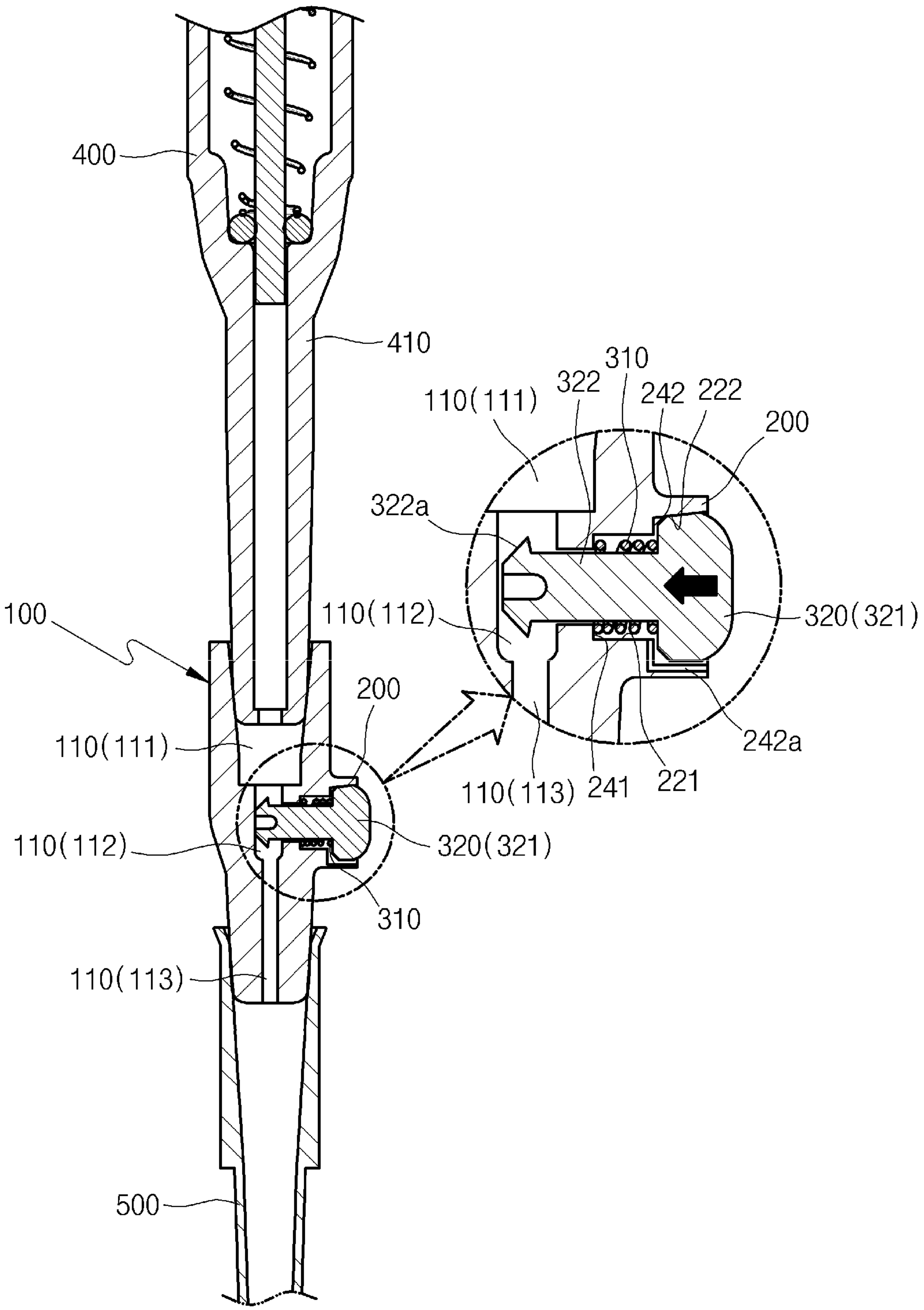
Figure 5C:
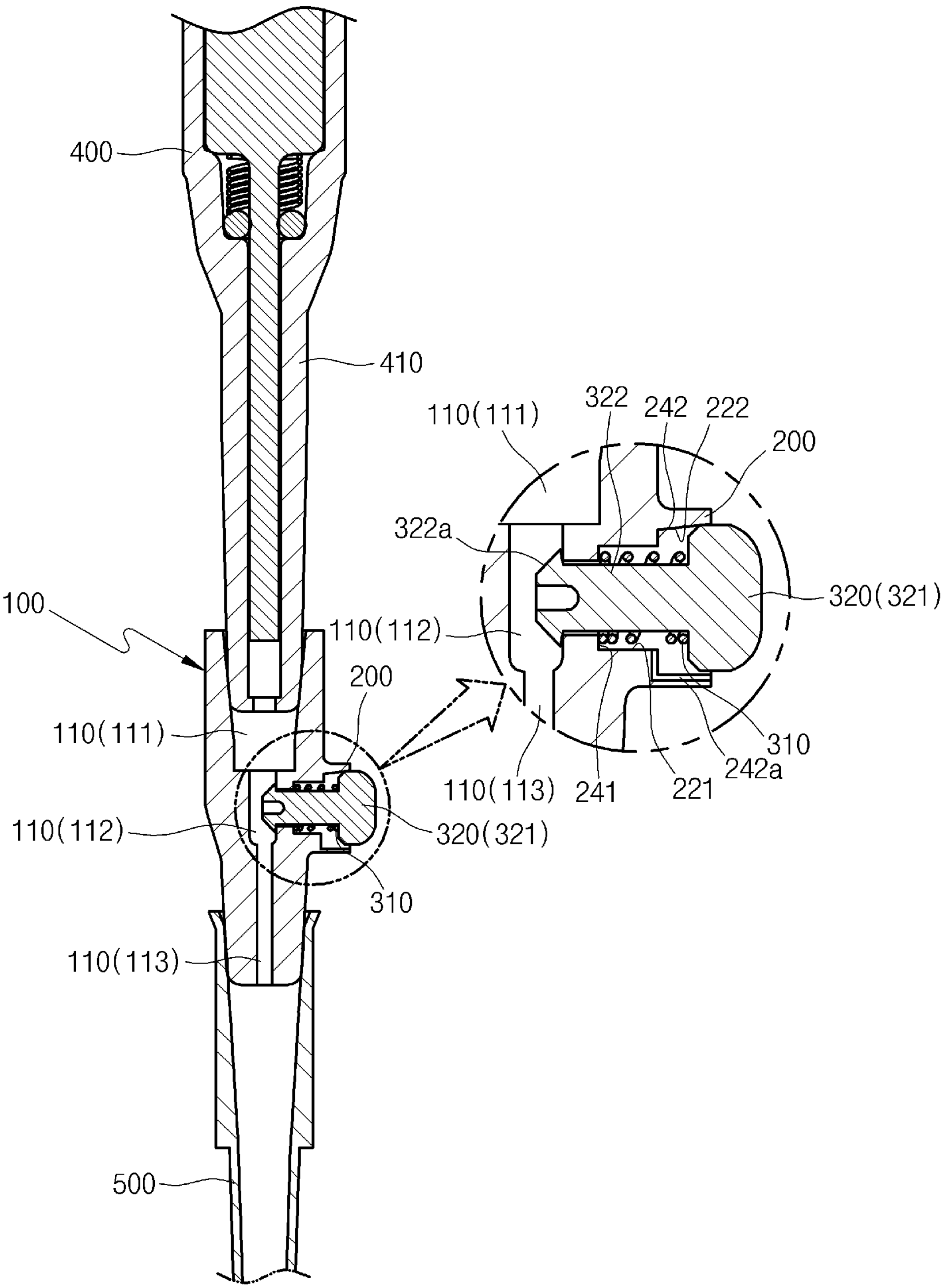

FIG. 4 shows the state where the capillary tip 500 of the socket 10 for coupling a capillary tip is coupled to the mini pipette 400. FIGS. 5A to 5C show the operation of the socket 10 for coupling a capillary tip.

As shown in FIG. 4, one side of the body 100 is provided to allow a mini pipette 400 to be inserted into it and coupled with it, and the other side of the body 100 is provided to be inserted into the inside of a capillary tip 500. Meanwhile, the intra-tubular passage 110 is formed straight in the longitudinal direction of the body 100 and is provided with an insertion hole 111, a central hole 112, and a connection hole 113 that are distinguished from one another.

The insertion hole 111 is formed on one side of the body 100 in a configuration where the suction unit 410 of the mini pipette 400 is inserted. The inner diameter of the insertion hole 111 is formed to be larger than the outer diameter of the suction unit 410 of the mini pipette 400, but the insertion hole 111 is provided in a size that allows the suction unit 410 of the mini pipette 400 to be press-fit and coupled.

The central hole 112 is formed on one side of the insertion hole 111 shown in FIG. 5A, and is formed to communicate to the through hole of the pressure-varying hole unit 200 to be described later. At this time, the inner diameter of the central hole 112 is smaller than the inner diameter of the insertion hole 111.

The connection hole 113 is formed on one side of the central hole 112 and is configured to connect to the inside of the capillary tip 500. At this time, the inner diameter of the connection hole 113 is formed smaller than the inner diameter of the central hole 112.

The pressure-varying hole unit 200 is formed in the body 100 and is configured to control pressure so as to cause a capillary action. As shown in FIG. 5A, the pressure-varying hole unit 200 is preferably composed of a through hole 210 and a stepped hole 220.

The through hole 210 is a passage through which the central hole 112 of the body 100 and the outside of the body 100 communicate with each other, and is formed on the outer circumferential surface of the body 100. The through hole 210 is preferably formed in a direction perpendicular to the central hole 112 of the body 100. That is, due to the configuration of the through hole 210 and the intra-tubular passage 110, the pressure change can be caused in the intra-tubular passage 110 by the change of opening and closing of the through hole 210.

The stepped hole 220 is a configuration for installing the pressure-varying hole unit 300 for opening and closing the through hole 210, and is formed in a direction from the through hole 210 toward the outside of the body 100. The inner diameter of the stepped hole 220 is formed to be larger than the inner diameter of the through hole 210, and thus a step 240 is formed between the through hole 210 and the stepped hole 220.

The stepped hole 220 is preferably formed to be double stepped. Accordingly, two steps 240 are formed in the stepped hole 220, and the stepped hole 220 also consists of two stepped holes 221 and 222. For convenience of explanation, they are referred to as the first stepped hole 221 and the second stepped hole 222 depending on how close to the through hole 210, and the step 240 formed between the through hole 210 and the first stepped hole 221 is referred to as first step 241, and the step 240 formed between the first step hole 221 and the second step hole 222 are referred to as second step 242.

The first step 241 is a part for disposing a spring to be described later, and the second step 242 corresponds to the head of the opening-and-closing unit 300 to be described later and is configured to limit excessive movement of the opening-and-closing unit 300.

As can be seen in FIGS. 2, 5A, and 5B, it is desirable that a vent groove 242*a* is formed in the second step 242. The vent groove 242*a* is intended to facilitate ventilation to the intra-tubular passage 110 when the through hole 210 of the opening-and-closing unit 300 is opened. A detailed explanation will be provided later. The vent groove 242*a* is provided in the form of a groove on one or both sides of the second step 242. As shown in FIGS. 2 and 5A, the vent groove 242*a* may extend in the height direction of the inner circumferential surface of the second stepped hole 222.

The opening-and-closing unit 300 plays a role of varying the pressure of the intra-tubular passage 110 by opening and closing the through hole 210 and the intra-tubular passage 110. In other words, opening-and-closing unit 300 plays a role of allowing the sample to be sucked into the capillary tip 500 by varying the pressure of the intra-tubular passage 110 to cause a capillary action. The opening-and-closing unit 300 is installed in the through hole 210 and the stepped hole 220 and is preferably composed of an elastic body 310 and a pressing member 320.

The elastic body 310 is placed in the stepped hole 220 and provides elastic force to the pressing member 320. The elastic body 310 is preferably a coil spring, as shown in FIG.

1, but it can be anything if it is possible to provide elastic force to the pressing member 320. The elastic body 310 is preferably placed in the first step 241.

The pressing member 320 serves to pass or block the stepped hole 220 and the intra-tubular passage 110 while moving straight between the through hole 210 and the stepped hole 220. The pressing member 320 serves to open or close the central hole 112 and the step hole 220 of the intra-tubular passage 110 to each other by a user's pressing action. The pressing member 320 is provided to be elastically supported by the elastic body 310 disposed in the stepped hole 220, and is preferably composed of a head part 321 and a hanging bar 322.

The head part 321 is a portion to which a user presses and applies force, and has a diameter corresponding to the inner diameter of the second stepped hole 222.

The hanging bar 322 opens and closes the space between the stepped hole 220 and the central hole 112 of the intra-tubular passage 110 while moving in the through hole 210, and is formed to extend from the head part 321 and has such diameter that it may pass through the through hole 210. In this case, A hanging piece 322*a* is formed at the end of the hanging bar 322, and extends radially outwards so that it can be hung and supported on the inner circumferential surface of the central hole 112 at which the through hole 210 is formed. As the hanging piece 322*a* is caught and supported on the inner circumferential surface of the central hole 112, the through hole 210 between the stepped hole 220 and the central hole 112 is closed, and when the user pushes the hanging bar 322 by pressing the head part 321, the hanging piece 322*a* gets spaced apart from the inner circumferential surface of the central hole 112 so that the central hole 112 and the stepped hole 220 can be opened. Opening the central hole 112 and the stepped hole 220 means that the pressure in the intra-tubular passage 110 is changed by making the intra-tubular passage 110 communicate to the outside of the body 100. Meanwhile, it is desirable that the material of the opening-and-closing unit 300 is malleable. This is because it is intended to increase the sealing performance of the intra-tubular passage 110 and the stepped hole 220 by increasing the sealing force when the hanging piece 322*a* is sealed against the inner circumferential surface of the central hole 112.

Hereinafter, a process of collecting a sample by connecting a capillary tip to a mini pipette using the socket 10 for coupling a capillary tip configured as described above will be described.

A user inserts the suction unit 410 of the mini pipette 400 into one side of the socket 10 for coupling the capillary tip. In addition, the user inserts the other side of the socket 10 for coupling the capillary tip into the capillary tip 500 so as to couple them. Accordingly, as shown in FIG. 4, the mini pipette 400 is coupled to the capillary tip 500 through the socket 10 for coupling the capillary tip, so that it is ready to collect samples. At this time, as shown in FIG. 5A, as the head part 321 of the pressing member 320 is pushed out of the stepped hole 220 by the elastic force of the elastic body 310, the hanging piece 322*a* is caught and supported by the inner circumferential surface of the central hole 112 so to closes the through hole 210.

The user takes the mini pipette 400 coupled as described above and puts the capillary tip 500 on the blood tube or fingertip of the test subject for blood collection. Thereafter, the user presses the head part 321 of the pressing member 320 to push the hanging bar 322 into the central hole 112 as shown in FIG. 5B, so that the intra-tubular passage may communicate with the outside air through the through hole 210 and thus the pressure of the intra-tubular passage 110 is changed. That is, as a result of the capillary action within the intra-tubular passage 110, the blood is drawn into the capillary tip 500. At this point, the head part 321 of the pressing member 320 is pressed against the second step 242 by the user's pressure. Even if the head part 321 is in contact with the second step 242, there is no obstruction to the communication between the intra-tubular passage 110 and the outside air, owing to the vent groove 242*a* formed in the shape of a recess on the second step 242.

When blood is sucked into the capillary tip 500, the user releases the pressing force of the pressing member 320 that has been pressurized. Accordingly, the pressing member 320 is returned to its original position as shown in FIG. 5A by the restoring force of the elastic body 310 which has been contracted, and so closes the through hole 210, so that the intra-tubular passage 110 does not communicate with outside air. As a result, the blood sucked into the capillary tip 500 stays inside the capillary tip 500. Thereafter, the user brings the mini pipette 400 to the analysis equipment, and then presses the push button 420 (see FIG. 4) of the mini pipette 400 to generate positive pressure in the suction unit 410, thereby discharging the blood of the capillary tip 500 to a designated place. Thus, collecting and discharging a small amount of blood using the socket 10 for coupling the capillary tip is completed.

As described so far, the socket 10 for coupling the capillary tip according to the present invention enables to accurately take a small amount of sample by using the capillary tip 500, and enables utilizing a manual sampling equipment when the sample collected in the capillary tip is discharged. Accordingly, the socket 10 for coupling the capillary tip can expand the use area by the application of manual sample collection equipment as well as electric equipment, and can simplify the overall configuration for sample collection and discharge so as to enhance competitiveness in individual examinations of the number of samples or in the fields of emergency medicine.

Although the present invention has been described in detail with respect to the described embodiments, it is obvious to those skilled in the art that various changes and modifications are possible within the scope of the technical idea of the present invention, and these changes and modifications belong to the appended claims.

The invention claimed is:

1. A socket for coupling a capillary tip to a sample collection equipment, the socket comprising:

a body having an intra-tubular passage penetrating through both sides thereof, wherein the intra-tubular passage includes an insertion hole configured to be coupled with a suction unit of the sample collection equipment, a connection hole configured to be coupled with the capillary tip, and a central hole between the insertion hole and the connection hole;

a pressure-varying hole unit which is formed in the body, and includes a stepped hole comprising at least two steps, and a through hole formed to communicate the intra-tubular passage to outside of the body; and an opening-and-closing unit which is elastically supported by the pressure-varying hole unit, and is installed to close or open the through hole and the intra-tubular passage while moving with an elastic force, wherein the pressure-varying hole unit includes a vent groove defined by an inner surface of an outermost step of the at least two steps to facilitate ventilation to the intra-tubular passage when the through hole is opened.

2. The socket for coupling a capillary tip of claim 1, wherein an inner diameter of the of the intra-tubular passage decreases in diameter so that an inner diameter of the insertion hole is larger than an inner diameter of the central hole, and the inner diameter of the central hole is larger than an inner diameter of the connection hole, and wherein the insertion hole is provided in a size that allows the suction unit to be press-fit and coupled.

3. The socket for coupling a capillary tip of claim 1, wherein a hole further from the intra-tubular passage has a larger inner diameter than a hole closer to the intra-tubular passage.

4. The socket for coupling a capillary tip of claim 3, wherein the opening-and-closing unit comprises:

an elastic body installed on a step of the at least two steps of the stepped hole; and a pressing member supported by the elastic body, and for opening and closing the through hole.

5. The socket for coupling a capillary tip of claim 1, wherein the through hole is directly connected to the intra-tubular passage.

* * * * *